Figure 1:
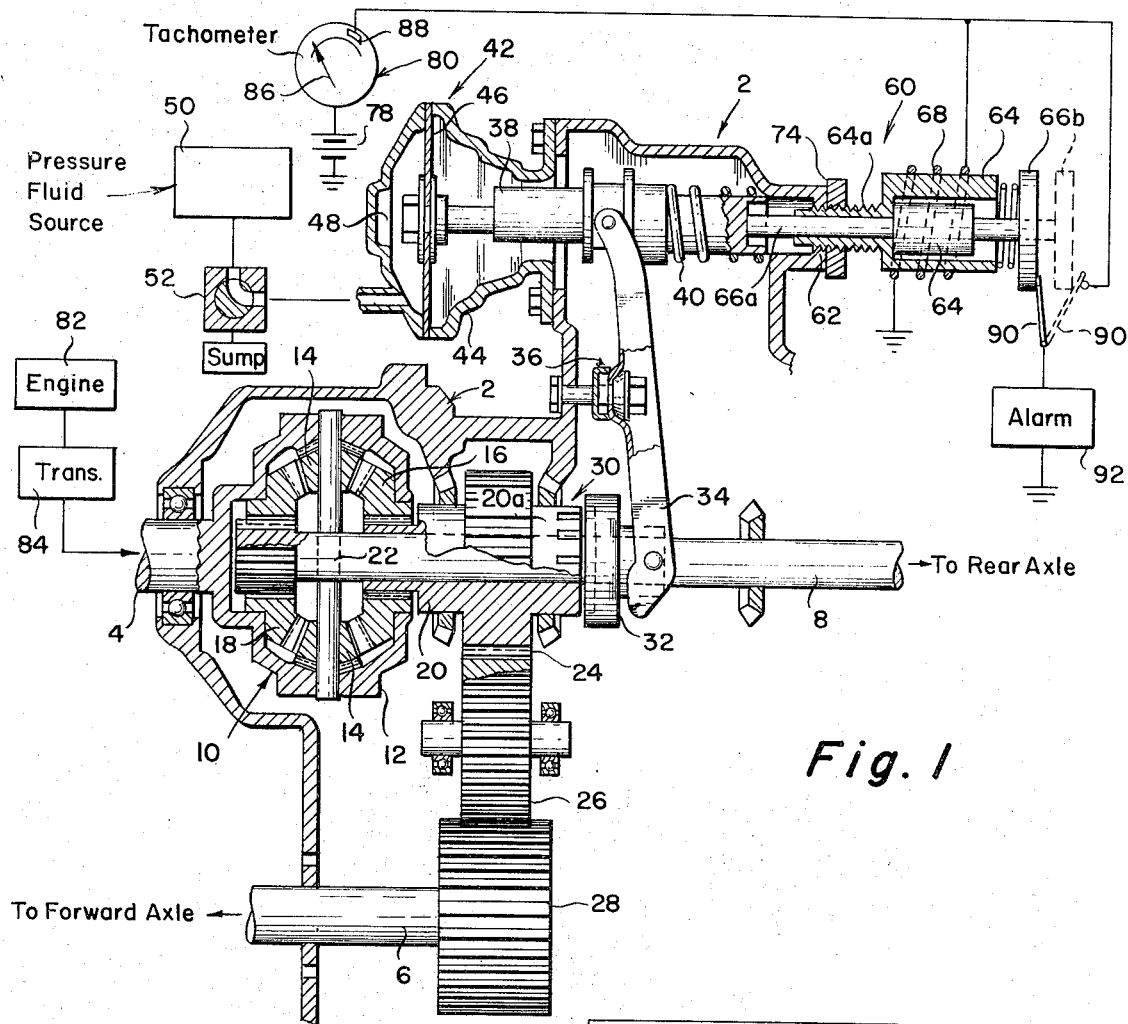

United States Patent [19]
Jeffers

[11] 3,871,249
[45] Mar. 18, 1975

[54] LOCK-UP DIFFERENTIAL INCLUDING SPEED-RESPONSIVE INHIBITING MEANS

[75] Inventor: Ellis E. Jeffers, Farmington, Mich.

[73] Assignee: Aspro, Incorporated, Westport, Conn.

[22] Filed: Mar. 1, 1974

[21] Appl. No.: 447,325

[52] U.S. Cl.............. 74/711, 74/710, 74/710.5, 74/713, 180/24.09, 180/88, 192/30 W
[51] Int. Cl..... F16h 1/44, B62d 61/00, F16d 23/00
[58] Field of Search.......... 74/711, 710, 710.5, 713; 192/30 W; 180/24.09, 88

[56] References Cited
UNITED STATES PATENTS

| | | | |
|---|---|---|---|
| 2,234,890 | 3/1941 | Brousseau | 74/710.5 |
| 3,169,595 | 2/1965 | Shepherd | 74/711 X |
| 3,195,371 | 7/1965 | Christie | 74/710.5 X |

Primary Examiner—Samuel Scott
Assistant Examiner—P. S. Lall
Attorney, Agent, or Firm—Lawrence E. Laubscher

[57] ABSTRACT

A differential mechanism of the lock-up type is disclosed which includes speed-responsive inhibiting means for preventing lock-up in the event that the speed of the input shaft (or, in the alternative, the engine shaft) exceeds a predetermined given value. The inhibiting means is connected with the differential housing opposite the shift control lever which operates the axially-displaceable lock-up collar, said inhibiting means being operable between inhibiting and non-inhibiting positions realtive to the shift control lever by solenoid means, pressure or vacuum motor means, or the like. Alarm means are provided for affording a visible and/or audible alarm in the event that the inhibiting member fails to be displaced to the inhibiting position when the shaft speed exceeds the predetermined given value.

11 Claims, 2 Drawing Figures

LOCK-UP DIFFERENTIAL INCLUDING SPEED-RESPONSIVE INHIBITING MEANS

Locking-type differential mechanisms are well known in the patented prior art as evidenced by the patents to Pringle U.S. Pat. No. 2,803,149, Christie U.S. Pat. No. 3,388,760, Taylor et al. U.S. Pat. No. 3,400,610, Muller-Berner U.S. Pat. No. 3,498,154 and Louckes et al. U.S. Pat. No. 3,732,752, among others. One drawback of the known locking type differentials is that if the lock-up mechanism were to be actuated during spin-out (when the speed of the differential input shaft is excessively high), it is likely that severe damage to the lock-up mechanism would be produced. While it has been suggested to inhibit lock-up by means responsive to vehicle speed, such proposals have the drawback that during a spin-out the vehicle can be stationary, with most of its wheels also being in a stationary condition. Consequently, locking up of the differential at such a time would destroy the lock-up teeth.

Accordingly, a primary object of the present invention is to provide an improved locking differential which includes speed-responsive inhibiting means for preventing operation of the lock-up means in the event that the differential input shaft — or, in the alternative, the engine shaft — exceeds a predetermined value. To this end, inhibitor means are connected with the differential housing for operation from a non-inhibiting position to an inhibiting position relative to the lock-up shift control means when the speed of the measured shaft exceeds the predetermined given value. The inhibitor means includes an inhibitor member, and motor means (such as a solenoid, a fluid pressure motor or a vacuum motor) for displacing the inhibitor member between its inhibiting and non-inhibiting positions.

In accordance with a more specific object of the invention, the inhibiting means is operable by speed-responsive means, such as a tachometer switch or the like, operable by the input shaft to the differential or, in the alternative, by the engine shaft, or any other shaft driven by the engine shaft. When the inhibiting means includes a solenoid operator, the solenoid is electrically connected with the tachometer for operation from one state of energization to the other when the shaft speed exceeds the given value. When the inhibiting means includes a fluid motor of the pressure or vacuum type, means may be provided for varying fluid pressure or vacuum as a function of the shaft speed being measured.

In accordance with another feature of the invention, alarm means are provided for sounding an audible and/or visible alarm in the event that the speed of the measured shaft exceeds the given value but the inhibiting means fail to operate to the inhibiting position (as might occur, for example, when the high wind-up torque holds the lock-up teeth in an engaged condition). The operator is thus advised to take the appropriate action (such as releasing engine power, stopping the vehicle, reversing vehicle direction or the like) to prevent damage to the lock-up means, the axle shafts, axle gearing, or any other part involved in the wind-up circuit. In the case where the inhibiting means includes a solenoid operator, the alarm means is connected in parallel with the solenoid via a normally-open switch that is maintained closed by the inhibitor member when said inhibitor member is in the closed position. In the case where the inhibitor means includes a fluid pressure operator, the alarm means may be directly connected with the speed-measuring tachometer for operation by a mormally-open switch that is maintained closed when the inhibiting member is in the non-inhibiting position.

Figure 2:
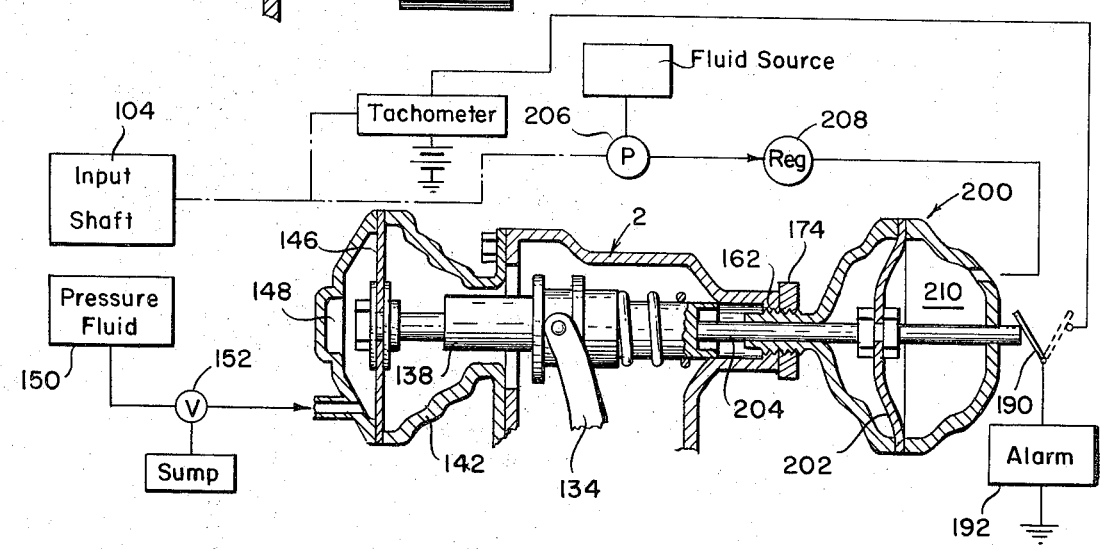

Other objects and advantages of the invention will become apparent from a study of the following specification when viewed in the light of the accompanying drawing, in which:

FIG. 1 is a detailed partly schematic sectional view of the preferred embodiment of the differential mechanism including solenoid means for inhibiting lock-up between the input and output shafts; and FIG. 2 is a partly schematic detailed view of another embodiment of the differential mechanism including fluid motor means for inhibiting lock-up between the input and output shafts.

Referring first more particularly to FIG. 1, the differential mechanism is of the inter-axle differential lock-up type including a housing 2 in which are journalled the ends of an input shaft 4, and first and second output shafts 8 and 6, respectively. The input shaft 4 drives conventional differential gearing means 10 including a carrier 12 which carries a plurality of pinions 14 which drive side gears 18 and 16 that are splined on first and second differential shafts 22 and 20, respectively. The second differential shaft 20 is connected with the second output shaft 6 via helical gears 24, 26, and 28, respectively, and the first differential shaft 22 — which is integral with the first output shaft 8 — carries conventional lock-up means 30. These lock-up means include an axially-displaceable lock-up collar 32 which is splined to the first output shaft 8 for axial shifting displacement to the left from the illustrated disengaged position to an engaged position in which lock-up teeth or splines on the collar engage corresponding teeth or splines 20a on the second differential shaft, thereby to lock-up the differential means 10. The lock-up collar is axially displaced by a shift control lever 34 that is pivotally connected intermediate its ends with the housing 2 by pivot means 36, the ends of the lever being pivotally connected with the collar 32 and with the axially displaceable actuator member 38 which is guided at its right hand end in a corresponding bore contained in the housing. Spring 40 mounted concentrically on the actuator member between an enlargement thereon and the housing wall surface bias lever 34 in the counterclockwise direction to displace the collar 32 toward the illustrated disengaged position.

In order to pivot lever 34 in the clockwise direction to effect engagement between the lock-up collar 32 and the lock-up teeth 20a on the differential shaft 20, fluid motor means 42 of the diaphragm type are provided including a diaphragm housing 44 containing a diaphragm 46 that defines a pressure chamber 48 to which pressure fluid is supplied from source 50 thereof via control valve 52. Consequently, when valve 52 is opened to admit pressure fluid into the chamber 48, actuator 38 is displaced to the right to pivot lever 34 in the clockwise direction to effect connection between the first output shaft 8 and the second differential shaft 20, thereby to lock-up the differential.

In accordance with a characterizing feature of the present invention, inhibiting means 60 are connected with an opening 62 contained in the upper portion of the housing for preventing the shift control lever from pivoting in the clockwise direction for a sufficient extent to shift collar 34 to the engaged position relative to the lock-up teeth 20a. In the embodiment of FIG. 1, these inhibiting means include solenoid means having a stator 64 having at one end a tubular portion 64a threadably connected with and extending partially through the housing opening 62, an armature 66 axially shiftable relative to said stator, and a solenoid coil 68 for energizing and de-energizing the solenoid means. When the solenoid means is energized, the armature is shifted to the left toward the illustrated inhibiting position, and when the solenoid means is de-energized, the armature is shifted to the right by spring means 70 toward the non-inhibiting position shown in phantom. At its left hand end, the armature has an extension 66a which extends through the tubular portion 64a and serves as an abutment for limiting the extent of right hand travel of the actuator member 38 when the solenoid means is in the illustrated energized condition, whereby engagement of the lock-up means 30 is prevented. When the solenoid means is de-energized, the armature is retracted to a position permitting free right hand travel of the actuator 38 and corresponding engagement of the lock-up means. The inhibiting position of the armature extension 66a may be adjusted by rotation of the stator relative to the housing and by corresponding setting of the stop-nut 74.

The solenoid coil 68 is electrically connected at one end with one terminal of a direct-current voltage source 78 by tachometer means 80 which are driven — in the illustrated embodiment — by the input shaft 4. In the alternative, when appropriate, the tachometer means 80 may be driven by any shaft of the engine 82 which drives input shaft 4 via the transmission 84. The tachometer means comprises a speed-responsive switch having movable and stationary switch contacts 86 and 88, respectively, that are closed when the speed of the input shaft reaches a given value. The other terminal of the d-c voltage source 78 and the other end of solenoid coil 68 are connected with ground.

Connected in parallel with the solenoid coil 68 by normally open switch means 90 are audible and/or visible alarm means 92. The switch means 90 are so arranged relative to an enlarged portion 66b at the free end of the armature 66 that the switch means are closed when the armature is in the non-inhibiting position illustrated in phantom.

OPERATION

Assume that the differential mechanism is connected as the inter-axle differential of a motor vehicle having rear and forward axles driven by the first and second output shafts 8 and 6, respectively. Assuming further that the speed of the input shaft is less than the predetermined given value set on the tachometer switch means 80, solenoid means 60 and alarm means 92 are de-activated, armature 66 is in the non-inhibiting position shown in phantom, and alarm switch 90 is closed. Upon opening of valve 52 to admit pressure fluid to diaphragm chamber 48, shift control lever 34 is pivoted in the clockwise direction to shift collar 32 to the left and thereby effect engagement between second differential shaft 20 and the first output shaft 8. The engine shaft is then directly coupled with both output shafts 6 and 8 of the differential mechanism in a conventional manner via transmission 84, input shaft 4 and differential means 10. Upon operation of the valve 52 to connect diaphragm chamber 48 to sump, actuator member 38 is shifted to the left by biasing spring 40, and shift control lever 34 is pivoted in the counterclockwise direction to effect disconnection of the first output shaft 8 from the second differential shaft 20.

Assume now that the vehicle operator should attempt to effect connection of the lock-up means at a time at which the rotational speed of the input shaft exceeds a given value (i.e., during "spin-out"). Since the movable contact 86 of the tachometer means 80 is in the closed position relative to stationary contact 88, solenoid means 60 is energized and the armature 66 is in the illustrated inhibiting position, switch 90 being in the illustrated open condition to de-energize the alarm 92. Consequently, when valve 52 is opened to supply pressure fluid to the diaphragm chamber 48, actuator 38 is prevented from being shifted to the right by the armature 66 from being shifted to the right, shift control lever 34 will be prevented from clockwise movement about pivot means 36, and collar 32 will be maintained disengaged from the second differential shaft 20. Thus, it is apparent that the vehicle operator is prevented from engaging the lock-up means during spin-out, whereby damage to the lock-up means is avoided.

Assume now that the lock-up means have been retained in the lock-up condition after the operator has closed the valve 52 to vent chamber 48 to sump (as might occur, for example, as a consequence of a high wind-up torque between the axles which hold the lock-up teeth in the lock-up position). Thus at rotational speed of the input shaft above the given value, the energized solenoid coil 68 fails to shift the armature 66 to the left to free the collar 32 from the lock-up teeth of shaft 20, and since switch 90 is closed by the armature end 66b, alarm 92 is activated to alert the vehicle operator to the undesirable condition of the differential mechanism. The driver would then take the necessary action to cause the differential to unlock (such as releasing engine power, stopping the vehicle, or reversing vehicle direction, for example).

It is apparent that various modifications may be made in the apparatus described. For example, the operation of the shift control lever means for operating the lock-up collar could be effected by manually, by electric motor means (i.e., a solenoid), or by pressure or vacuum fluid motor means. Similarly, the operation of the lock-up inhibiting means could be controlled by pressure or vacuum fluid motor means. Referring to the alternate embodiment illustrated in FIG. 2, it will be seen that the inhibiting means comprises a pressure fluid motor 200 connected with the housing opening 162, said fluid motor including a diaphragm 202 that carries the inhibiting stem 204 that extends at one end in the housing adjacent the actuator member 138 and at the other end through an opening in the diaphragm housing adjacent the alarm switch 190. In operation, a pump 206 is driven by the input shaft 104 for pumping fluid to the normally closed pressure-responsive fluid regulator 208. When the speed of the input shaft speed equals the predetermined value, the pump pressure exceeds the predetermined pressure of regulator 208, whereupon regulator 208 opens to supply fluid to chamber 210, thereby placing the inhibiting member 204 in the illustrated inhibiting position. In the event that the member 204 is prevented from shifting to the left (for example, by a locked up condition of the shiftable collar), alarm switch 90 is closed to activate the alarm 192 as described above with reference to FIG. 1.

What is claimed is:

1. In a differential mechanism of the lock-up type driven by an engine shaft and including a housing, an input shaft rotatably connected with said housing, differential means driven by said input shaft, said differential means including first and second differential shafts, and lock-up means operable alternately between disengaged and engaged conditions to disconnect and connect said second differential shaft with said first differential shaft, thereby to release and to lock-up the differential means, respectively; the improvement which comprises inhibiting means for preventing said lock-up means from connecting said second differential shaft with said first differential shaft when the speed of one of said engine and input shafts exceeds a given value, whereby damage to said lock-up means at high shaft speeds is avoided.

2. Apparatus as defined in claim 1, and further including normally de-activated alarm means, and means for activating said alarm means when said lock-up means is in the engaged condition and the speed of said one shaft exceeds said given value.

3. Apparatus as defined in claim 1, wherein said second differential shaft is cylindrical and is concentrically mounted coaxially upon said first differential shaft; and further wherein said lock-up means includes a lock-up collar non-rotatably connected with and mounted for axial sliding movement on said first differential shaft for displacement between engaged and disengaged positions relative to said second differential shaft, respectively, said collar including lock-up teeth for engaging corresponding teeth on said second differential shaft when said collar is in the engaged position, and shift control means for shifting said lock-up collar between said engaged and disengaged positions, said inhibiting means being operable to engage said shift control means and prevent the same from shifting said lock-up collar to the engaged position when the speed of said one shaft exceeds said given value.

4. Apparatus as defined in claim 3, wherein said inhibiting means comprises a. solenoid means including a stator connected with said housing, and an armature movable relative to said stator in accordance with the state of energization of said solenoid means, said stator being so arranged relative to said shift control means that when said solenoid means has first and second states of energization, said armature has non-inhibiting and inhibiting positions, respectively, relative to said shift control means; and b. means responsive to the rotational speed of one of said engine and input shafts for causing said first and second states of energization when the speed of said input shaft is below and above said given value, respectively.

5. Apparatus as defined in claim 4, wherein said speed responsive means includes tachometer means driven by one of said engine and input shafts for effecting said first and second states of energization of said solenoid means.

6. Apparatus as defined in claim 5, wherein said solenoid means is de-energized and energized when in said first and second states of energization, respectively; and further including electrically operable alarm means, and switch means for connecting said alarm means in parallel with said solenoid means when said armature is in the non-inhibiting position, whereby when the speed of said input shaft exceeds said given value and said armature fails to move to the inhibiting position, said alarm means is activated via said switch means.

7. Apparatus as defined in claim 6, and further including spring means biasing said armature toward the non-inhibiting position.

8. Apparatus as defined in claim 3, wherein said shift control means includes a shift control lever pivotally connected intermediate its ends with said housing, one end of said shift control means being connected with said lock-up collar, spring means biasing said shift control lever in one direction to effect disengagement of said collar from said second differential shaft, and means adjacent the other end of said lever for pivoting said lever in the opposite direction to effect engagement of said collar with said second differential shaft.

9. Apparatus as defined in claim 7, wherein said inhibiting means includes solenoid means connected with said housing for preventing pivotal movement of said shift control lever in said opposite direction when the speed of one of said engine and input shafts exceeds said given value.

10. Apparatus as defined in claim 7, wherein said inhibiting means comprises pressure motor means connected with said housing for preventing pivotal movement of said shift control lever in said opposite direction when the speed of said input shaft exceeds said given value.

11. Apparatus as defined in claim 7, and further including means for adjusting the effective inhibiting position of said inhibiting means relative to said shift control lever.

* * * * *